United States Patent
Shvartsman

(10) Patent No.: US 8,358,520 B2
(45) Date of Patent: Jan. 22, 2013

(54) HIGH EFFICIENCY CHARGE-AND-ADD ADJUSTABLE DC-DC CONVERTER

(76) Inventor: Vladimir Shvartsman, Louisville, KY (US)

( * ) Notice: Subject to any disclaimer, the term of this patent is extended or adjusted under 35 U.S.C. 154(b) by 686 days.

(21) Appl. No.: 12/559,021

(22) Filed: Sep. 14, 2009

(65) Prior Publication Data

US 2011/0062940 A1 Mar. 17, 2011

(51) Int. Cl.
 *H02M 3/18* (2006.01)
 *H02M 7/00* (2006.01)
 *G05F 1/10* (2006.01)
 *G05F 3/02* (2006.01)

(52) U.S. Cl. .................................. 363/60; 327/536

(58) Field of Classification Search .............. 363/59–61; 327/536

See application file for complete search history.

(56) References Cited

U.S. PATENT DOCUMENTS

| | | | | |
|---|---|---|---|---|
| 6,055,168 A | * | 4/2000 | Kotowski et al. | 363/60 |
| 6,400,211 B1 | * | 6/2002 | Yokomizo et al. | 327/536 |
| 7,382,634 B2 | * | 6/2008 | Buchmann | 363/60 |
| 2002/0149416 A1 | * | 10/2002 | Bandy et al. | 327/536 |
| 2003/0011420 A1 | * | 1/2003 | Kawai et al. | 327/536 |
| 2003/0146783 A1 | * | 8/2003 | Bandy et al. | 327/536 |

* cited by examiner

*Primary Examiner* — Jue Zhang
(74) *Attorney, Agent, or Firm* — Clifford Kraft

(57) ABSTRACT

A charge-and-add DC-DC voltage converter design using a switch network that toggles between two states, either simultaneously charging a flying capacitor (one or any number) or creating a DC voltage on the output capacitor by connecting all flaying capacitors in series thus adding the input voltage to remaining voltages on flying capacitors after they were charged. A pulse generator delivers a train of pulses to toggle the switch network. Depending on the applications, the train of pulses can be continuous when a fixed unregulated voltage must be delivered, or a defined number of pulses when voltage (power) surge is to be produced. The charge-and-add converters should be capable of delivering a regulated output voltage, and in this case, pulse-width modulation (PWM) or pulse frequency modulation (PFM) can be used.

8 Claims, 5 Drawing Sheets

HIGH EFFICIENCY CHARGE-AND-ADD ADJUSTABLE DC-DC CONVERTER

BACKGROUND

1. Field of the Invention

The present invention relates generally to the field of voltage converters and more particularly to a high-efficiency, charge-and-add adjustable converter.

2. Description of the Field

Converting from a low voltage to a high voltage, and from a high voltage to a low voltage is one of the outmost important fields in the electronics art. There are few electronic or electrical apparatus that will work without some type of power converting, since all of them need a specific and defined voltage for a proper operation. Among all converters, DC-DC converters represent the largest number. DC-DC converters vary by a purpose, functionality, technique, etc. DC-DC converters are distinguished by power capability, input/output voltages, and the technique by which the converting occurs. Converters also compete by how efficiently they converter one voltage into another.

DC-DC charge pump designs have been around the last thirty years. Among various topologies, a switched-capacitor voltage multiplier circuit is known in the art. Since introduction the switched-capacitor circuitry, the emphasis has been on obtaining the most voltage gain with minimum components. There are a number of inventions describing a charge pump DC-DC as an inverter, splitter or booster known in the art. They can double voltage, triple voltage, halve voltages, invert voltages, fractionally multiply or scale voltages such as ⅔×, ⅓×, etc. and generate arbitrary voltages.

The best of the prior art charge pump converters can deliver up to about 250 mA at around 75% efficiency. Most of their applications are in battery-based systems such as cellular phones, pages, Bluetooth systems, portable electronic equipment, and handheld instruments. A major application is to power white LEDs for backlighting LCD panels. The basic charge pump lacks regulation, so virtually all present-day charge pump converters either add linear regulation or charge-pump modulation.

What is badly needed is a charge-and-add converter with pulse frequency modulation which is one of the most efficient power converting devices that can deliver output voltage with up to 98% efficiency. This efficiency, with all power components (switches and capacitors), is the same depending on chosen frequency of switching and how often a charge-and-add cycle occurs.

The charge-and-add converter of the present invention is an innovative topology among many approaches to the charge pump design, the switch-capacitor circuits. It allows converting much power from a low voltage, high current source into a load that required a higher voltage and not as much current. The charge-and-add can be use to build multi-kilowatt converters and power an electrical car, convert a low voltage produced by a photo-cell into a more useful high voltage to power home appliances and machinery.

SUMMARY OF THE INVENTION

The present invention relates to a charge-and-add converter design and provides DC-DC voltage conversion using a switch network that toggles between two states, either simultaneously charging several flying capacitors (any number) and creating a DC voltage on the output capacitor by connecting all flaying capacitors in series thus adding the input voltage to remaining voltages on flying capacitors after they were charged. By flying capacitors, I mean a set of capacitors that can be charged in parallel to a particular input voltage, and can then be switched into a series configuration where the voltage on each of the flying capacitors adds to produce a new voltage that is the sum of the voltages on each of the flying capacitors.

A pulse generator delivers a train of pulses to toggle the switch network. Depending on the applications, the train of pulses can be continuous when a fixed unregulated voltage must be delivered, or a defined number of pulses when voltage (power) surge is to be produced. The charge-and-add converters should be capable of delivering a regulated output voltage, and in this case, pulse-width modulation (PWM) or a pulse frequency modulation (PFM) can be adopted.

The charge-and-add of the present invention operated by charging all flying capacitors and after that adding all voltages from them and discharging the total voltage into the output capacitor thus transferring energy to the output load. There are generally two cycles (phases) of operation. The first phase charges of all flaying capacitors and during the next phase, the switch network rearranges all flying capacitors connecting them in series.

The PWM technique allows regulating the output voltage precisely, but when there is no need for precision, like delivering a voltage to drive a motor, the PFM is preferable. The PWM method delivers pulses with variable duration within a steady stream. The PFM method delivers pulses of the same duration only when flying capacitors must be charged for maintaining an output-regulated voltage. When the output is above the targeted regulated voltage, the switches do not connect capacitors for charging; the circuit stays idol and consumes a minimum supply current. The charge stored in capacitors supply a current into a load. As the capacitors discharge, and the output voltage falls below a nominal value, the switches are activated again.

The present invention enables delivering a targeted output voltage in just a few clock cycles. A typical charge-pump topology requires a number of clock cycles (that depends on how many stages involved). The charge-and-add design of the present invention charges a number of flying capacitors in parallel at the same time that allows delivering a megawatt power into a load using a relatively low power switches. The present invention enables to build a DC/DC converter with adjustable output voltage from a zero volts to the maximum. The present invention offers a new switching topology that allows charging a number of capacitors in parallel and creating an output by combining (adding) all voltages from capacitors, thus having unlimited capacity for delivering an output power. The present invention presents the major advantage by elimination of magnetic field and EMI that generates others DC/DC converters that were using transformers or indictors.

DESCRIPTION OF THE FIGURES

Attention is now directed to several drawings that illustrate features of the present invention.

Several drawings and illustrations have been presented to aid in the understanding of the present invention. The scope of the present invention is not limited to what is shown in the figures.

DETAILED DESCRIPTION OF THE INVENTION

The present invention relates to a charge-and-add converter design and provides DC-DC voltage conversion using a switch network that toggles between two states, either simultaneously charging a flying capacitor (one or any number) or creating a DC voltage on the output capacitor by connecting all flaying capacitors in series thus adding the input voltage to remaining voltages on flying capacitors after they were charged. A first flying capacitor doubles the input voltage on the output capacitor and each additional flying capacitor adds voltage that is equal to the input voltage, according to the following equation Vout=Vin+n*Vin, (where n is equal to the number of flying capacitors.)

Figure 1:
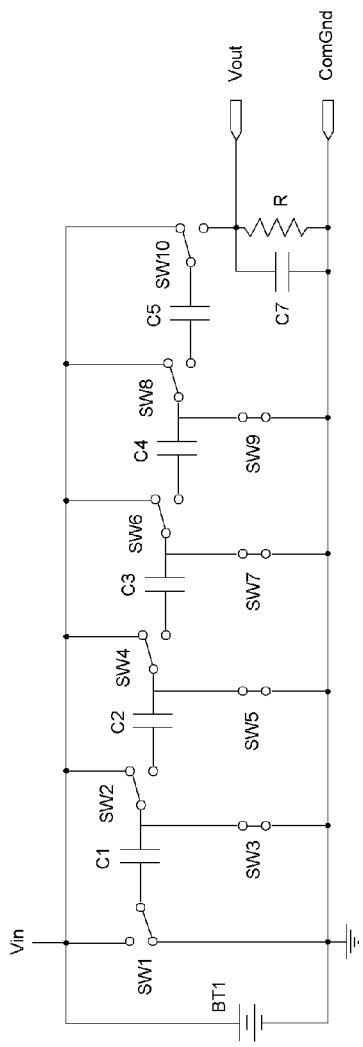
FIG. 1 shows a switch-network of the charge-and-add converter showing the phase of charging all flying capacitors.

Vin is an input voltage from a battery, solar cells, thermo-electricity, power supply, or any other source of power, and the Vout is the output voltage. For an example, assume that the charge-and-add starts in phase I (as shown in FIG. 1). All flaying capacitors C1, C2, C3, C4, and C5 is charged to the input voltage (Vin) with aid of the switch network. During this time, the output capacitor C7 has no initial charge. During phase II, as it shown in The FIG. 2, the switching network connects all the flying capacitors in serious. At that time, energy stored in all flying capacitors is applied onto the load and is shared with the output capacitor C7. The output capacitor performs two functions: 1) it provides the energy to the load during the charging cycle, and 2) it smoothes out the output by absorbing transient spikes.

A multiplied (maximum) voltage on the output (capacitor C7) of the charge-and-add converter will be reached on the second clock pulse. In a prior art cascaded charge pump topology, the maximum voltage would be obtained only after many charging and pumping cycles; the more cascades, the longer it takes.

Figure 3:
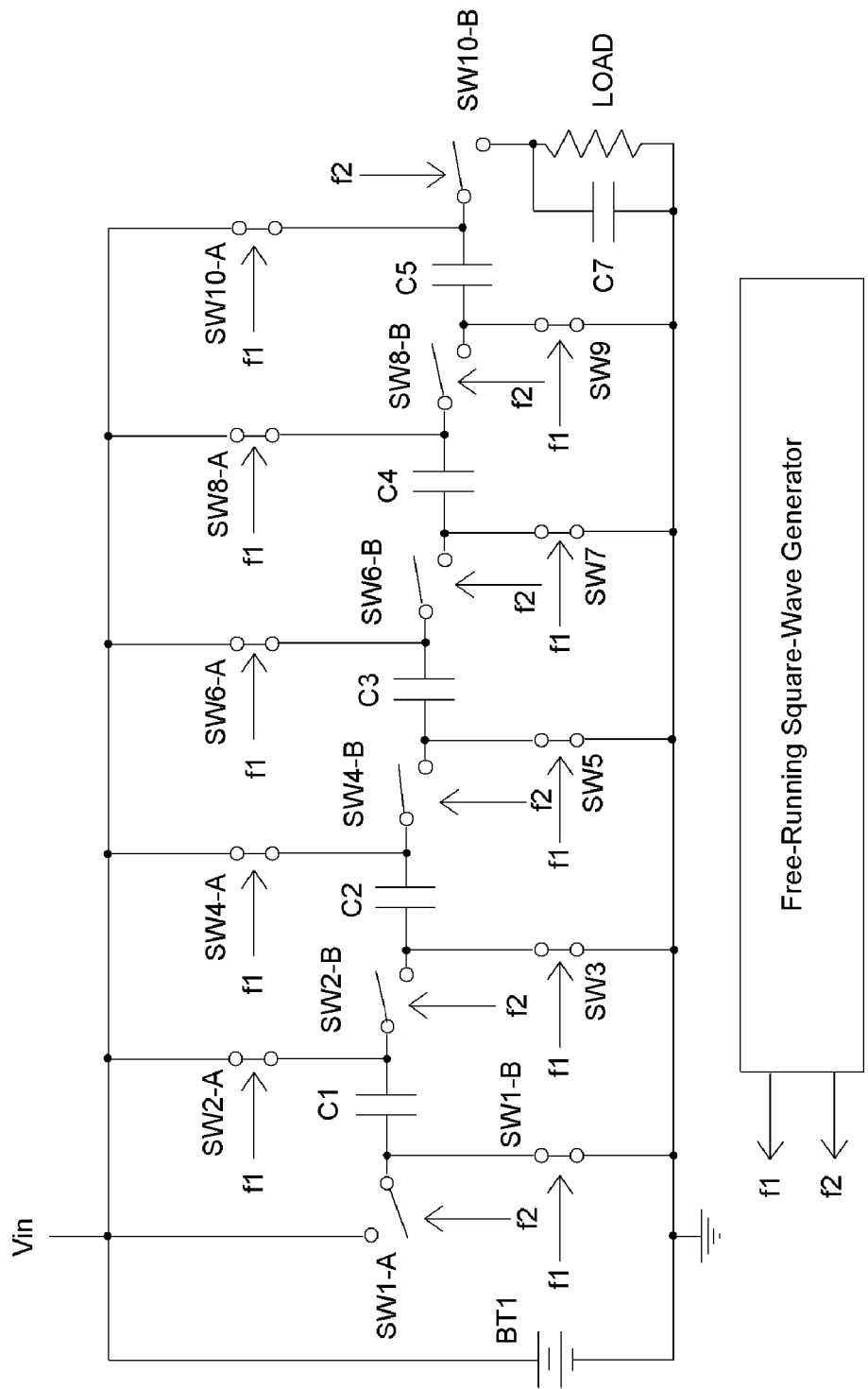
FIG. 3 shows a switch-network with a free-running square-wave generator which generates two shifted signals to toggle all switches.

FIG. 3 shows the charge-and-add converter with a generator that delivers pulses to toggle the switch network. Attention should be paid during selecting a proper frequency. Increasing the switching frequency increases power loss, but also allows smaller capacitor values of the flying capacitors. A simple square-wave generator can provide a constant frequency for a low noise output voltage as well as low input noise as shown in FIG. 3. High frequency operation simplifies filtering that further reduces conductive noise.

Figure 4:
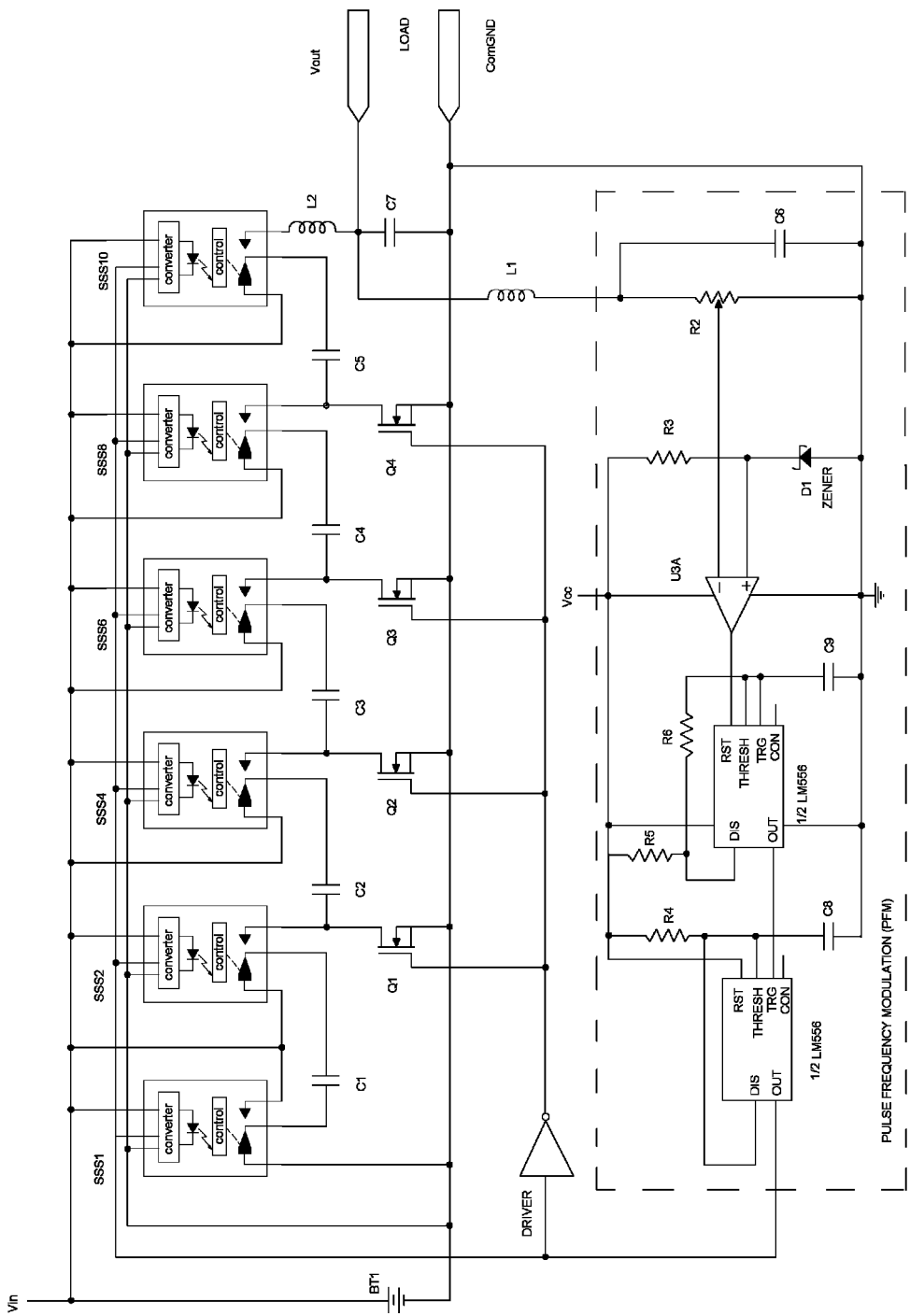
FIG. 4 shows an embodiment with an inexpensive control for adjustment of the output voltage that can be accomplished with two pulse generators assembled with LM556s.

A free running square-wave generator is the least efficient way to toggle switches. It also doesn't allow regulating the output voltage. A pulse width modulated generator allows controlling the output voltage, but has efficiency comparable to a free-running control, because there is the same number of toggles. A pulse frequency modulated (PFM) signal allows changing the actual repetition rate of the pulse train. FIG. 4 shows the charge-and-add converter design of the present invention with a pulse frequency modulated (PFM) generator which is the most efficient because the PFM generates a pulses only when the output voltage falls below its target.

Based on the charge-and-add topology, varieties of DC/DC converters can be devised. FIG. 4 shows a simplified circuit diagram of an adjustable DC/DC converter with the maximum output voltage of seven times to the input voltage. The switch network design combines MOSFET transistors Q1, Q2, Q3, and Q4 with high-speed SPDT Solid-State Switches, SSS1, SSS2, SSS3, SSS4, SSS5, and SSS6 similar to those made by Electronic Design & Research Inc. of Louisville Ky. The switch network is toggled by a pulse frequency modulator designed on commonly available components, namely an LM556 dual timer and a comparator. High performance capacitors C1, C2, C3, C4, C5 should be selected with low equivalent resistance (ESR) for minimizing output ripples, output resistance and to maximize efficiency. For low-power converters, ceramic capacitors, or some types of tantalum capacitors may be adequate.

The Solid-State Switches have built-in drivers, and require generally less than 1 mA current of controlling pulse current and can be driven directly by the LM556, where MOSFETs would required a dedicated high-power driver. This effect is especially true for designing a high-power converter. Driving a high power MOSFET at a high frequency required several amperes of current during a turn-on cycle and the same amount of current to discharge during the turn-off cycle. Nevertheless, the solid-state switches can be replaced by MOSFETS; however, that makes the implementation more complex because of the significant needs for energy to drive MOSFETs transitionally lost during turn-on and turn-off cycles that decreases the overall efficiency of the converter.

Figure 5:
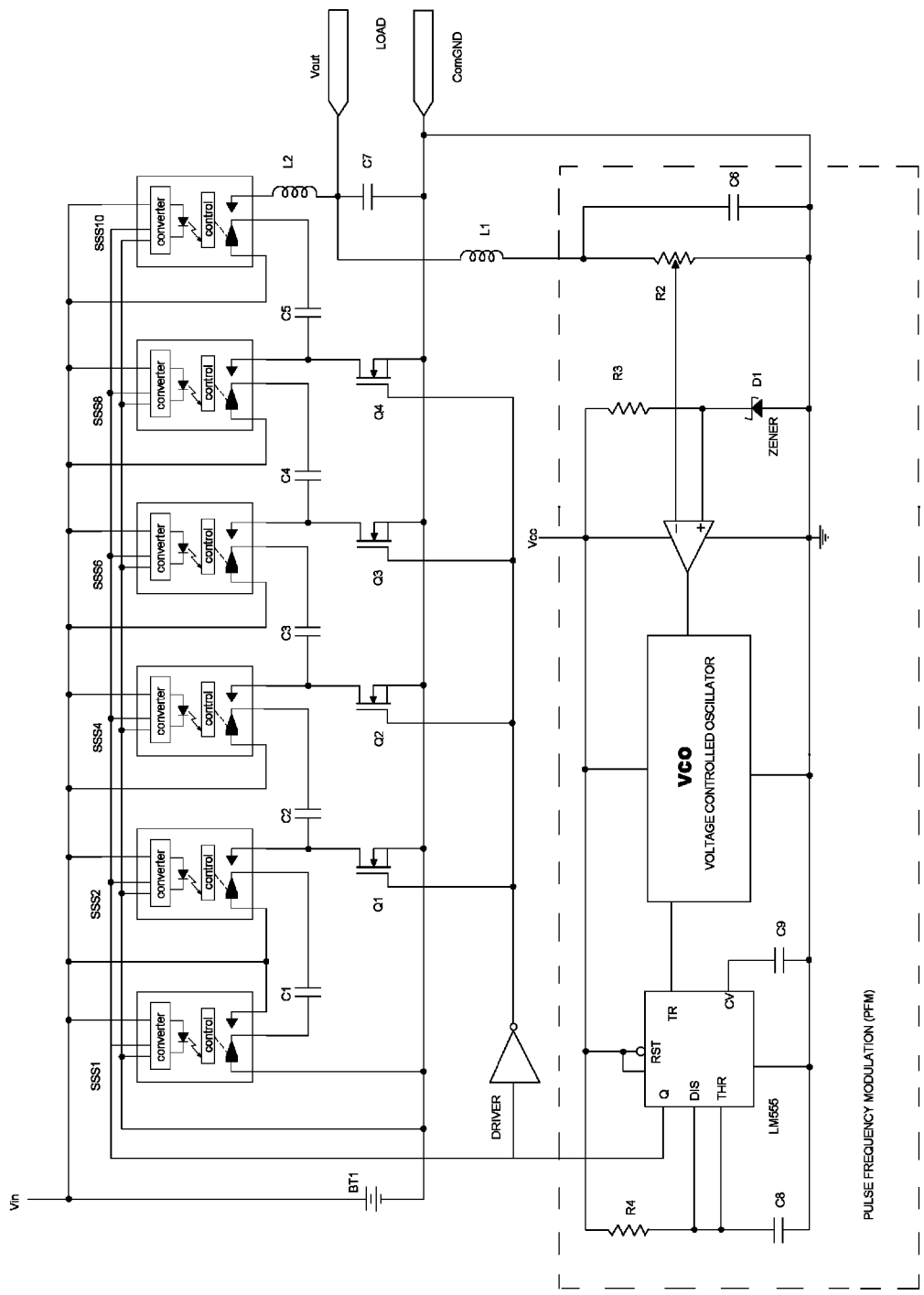
FIG. 5. shows how fine adjustment of the output voltage can be achieved with a voltage controlled oscillator (VCO) and a pulse generator assembled with an LM555.

FIG. 5 shows how fine adjustment of the output voltage can be achieved with a voltage controlled oscillator (VCO) and a pulse generator assembled with an LM555 to produce PFM pulses.

The inductors shown in FIGS. 4-5 provide transient filtering and control the rise-time on the output voltage.

Figure 2:
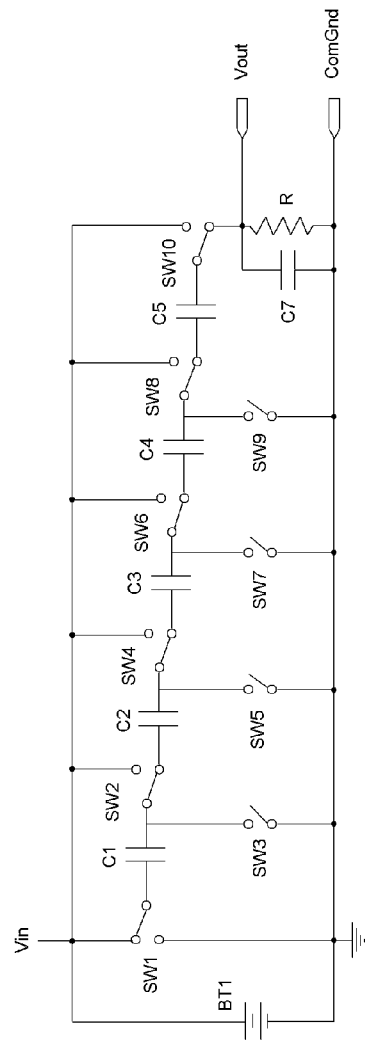
FIG. 2 shows switch-network of the charge-and-add converter showing the phase where all flying capacitors connected in series to add up all voltages from them.
Figure 6:
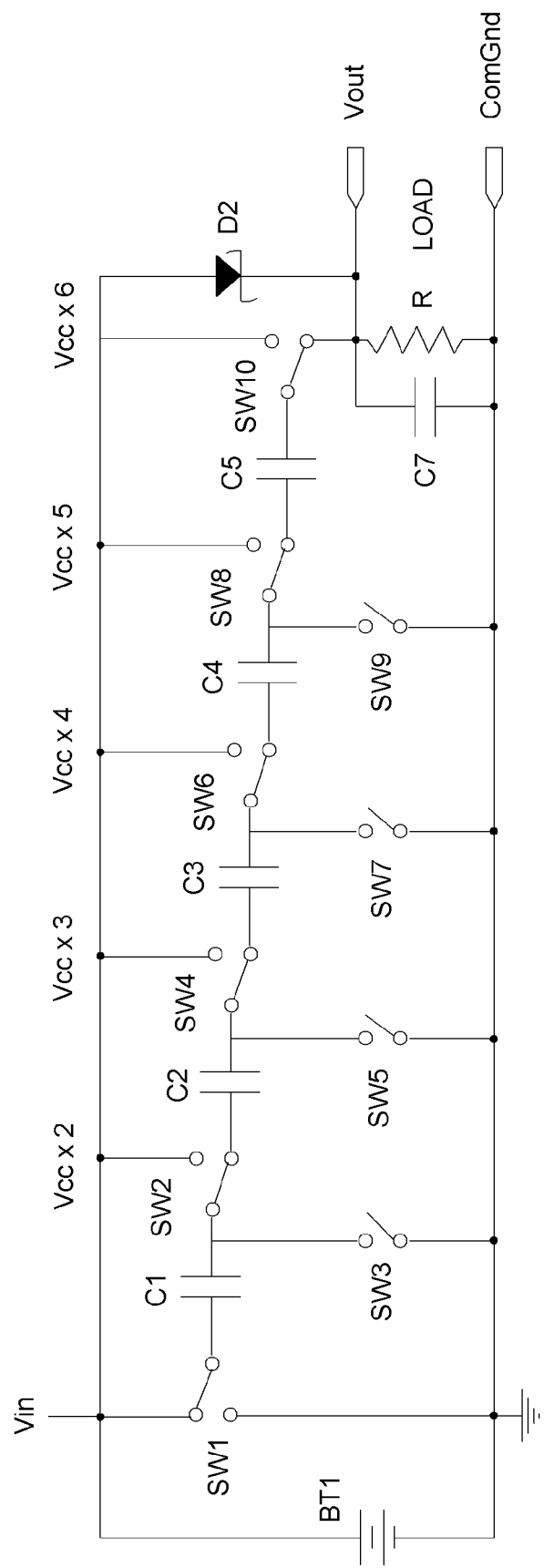
FIG. 6 shows the circuit of FIGS. 1-2 with a protective Schottky diode.

FIG. 6 shows the circuit of FIGS. 1-2 with a protective Schottky diode. This diode should be rated at well over the output voltage and should have high current capacity. An example that could be used in a 300V output supply (with 50 volts in as in FIG. 6) could be a 400 V/30 A diode. This diode prevents any reverse current flowing from the output back into the input supply.

Several descriptions and illustrations have been provided to aid in understanding the features of the present invention. One skilled in the art will recognize that many changes and variations can be made without departing from the spirit of the invention. Each of these changes and variations is within the scope of the present invention.

The invention claimed is:
1. A DC-DC voltage converter comprising:
 a plurality of flying capacitors;
 a plurality of electronic switches, wherein each of said switches has a first switch position and a second switch position;
 an output capacitor coupled to a load;
 a pulse generator driving said plurality of electronic switches with a pulse train so that said switches toggle between said first switch position and said second switch position;
 wherein said flying capacitors each charge to an input voltage value in said first switch position; and
 wherein said flying capacitors are connected in series in said second switch position to deliver an output voltage to said load, said output voltage being higher than said input voltage;
 and wherein each of said switches is a high-speed SPDT solid-state switch module.
2. The DC-DC converter of claim 1 wherein said pulse train is pulse-width modulated (PWM).

3. The DC-DC converter of claim 1 wherein said pulse train is pulse-frequency modulated (PFM).

4. The DC-DC converter of claim 3 wherein said pulse train is produced by a voltage controlled oscillator (VCO).

5. The DC-DC converter of claim 1 wherein each of said switches contains at least one MOSFET transistor.

6. A DC-DC voltage converter comprising:
a plurality of flying capacitors;
a plurality of electronic switches, wherein each of said switches has a first switch position and a second switch position;
an output capacitor coupled to a load;
a pulse generator driving said plurality of electronic switches with a pulse train so that said switches toggle between said first switch position and said second switch position;
wherein said flying capacitors each charge to an input voltage value in said first switch position; and
wherein said flying capacitors are connected in series in said second switch position to deliver an output voltage to said load, said output voltage being higher than said input voltage;
wherein said pulse generator delivers either pulse-width modulated (PWM) or pulse frequency modulated (PFM) pulses;
and wherein each of said switches is a high-speed SPDT solid-state switch module.

7. The DC-DC converter of claim 6 wherein each of said switches contains at least one MOSFET transistor.

8. The DC-DC converter of claim 6 wherein said PFM pulses are supplied from a voltage controlled oscillator (VCO).

* * * * *